United States Patent
Don et al.

(10) Patent No.: US 11,973,631 B2
(45) Date of Patent: Apr. 30, 2024

(54) CENTRALIZED HOST INACTIVITY TRACKING

(71) Applicant: Dell Products L.P., Hopkinton, MA (US)

(72) Inventors: Arieh Don, Newton, MA (US); Krishna Deepak Nuthakki, Bangalore (IN)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/901,970

(22) Filed: Sep. 2, 2022

(65) Prior Publication Data
US 2024/0080236 A1    Mar. 7, 2024

(51) Int. Cl.
*H04L 41/06* (2022.01)
(52) U.S. Cl.
CPC .................................... *H04L 41/06* (2013.01)
(58) Field of Classification Search
CPC ....................................................... H04L 41/06
See application file for complete search history.

(56) References Cited

U.S. PATENT DOCUMENTS

| 10,254,970 | B1* | 4/2019 | Martin | G06F 3/061 |
| 2002/0095489 | A1* | 7/2002 | Yamagami | G06F 11/2094 |
| | | | | 709/224 |
| 2020/0252319 | A1* | 8/2020 | Specht | H04L 45/02 |
| 2021/0026650 | A1* | 1/2021 | Rao | G06F 3/0622 |

* cited by examiner

*Primary Examiner* — Aftab N. Khan
*Assistant Examiner* — Patrick F Ngankam
(74) *Attorney, Agent, or Firm* — Anderson Gorecki LLP

(57) ABSTRACT

Within a domain such as a data center, host server activity monitors running on storage nodes observe meaningful commands sent by host servers to the storage nodes. Inactivity indicated by failure of any of the activity monitors to receive a meaningful command from a host server within a predetermined time limit prompts generation of a message that identifies that host server as possibly being unused. The host server activity monitors are also configured to identify as a possible unused host server any host server that is zoned for at least one of the storage nodes but not masked to any storage objects. If a quiescent host server becomes active, as indicated by resumption of sending meaningful commands to one of the storage nodes, then a message warning of a potential malicious attack is generated.

17 Claims, 4 Drawing Sheets

US 11,973,631 B2

CENTRALIZED HOST INACTIVITY TRACKING

TECHNICAL FIELD

The subject matter of this disclosure is generally related to identification of unused host servers in a data center.

BACKGROUND

Data centers can include hundreds or thousands of host servers and multiple data storage nodes such as storage arrays that maintain storage objects that are contemporaneously accessed by multiple instances of host applications running on the host servers. Individual host servers may use a hypervisor or containers to implement virtualization and the number of virtual machines (VMs) running on a hypervisor and guest operating systems (OSs) running on containers can change dynamically due to instantiation, de-instantiation, and migration. In such an environment it is difficult to identify host servers that are powered-ON and running, and may have connectivity with a storage array, but do not send commands or IOs for productive purposes. Such unused hosts are potentially problematic not only because they consume power and valuable resources such as switch/SAN ports and rack space but also present vulnerable entry points for malicious attacks.

SUMMARY

A method in accordance with some implementations comprises monitoring communications from a plurality of host servers to a plurality of storage nodes within a domain; identifying, from the communications, meaningful communications that are indicative of productive activity by ones of the host servers; determining that one of the host servers has ceased generating meaningful communications; and generating a message to prompt remedial action.

An apparatus in accordance with some implementations comprises a plurality of storage nodes configured to: monitor communications from a plurality of host servers within a domain; identify, from the communications, meaningful communications that are indicative of productive activity by ones of the host servers; determine that one of the host servers has ceased generating meaningful communications; and generate a message to prompt remedial action.

In accordance with some implementations a non-transitory computer-readable storage medium stores instructions that when executed by a computer cause the computer to perform a method comprising: monitoring communications from a plurality of host servers to a plurality of storage nodes within a domain; identifying, from the communications, meaningful communications that are indicative of productive activity by ones of the host servers; determining that one of the host servers has ceased generating meaningful communications; and generating a message to prompt remedial action.

This summary is not intended to limit the scope of the claims or the disclosure. Other aspects, features, and implementations will become apparent in view of the detailed description and figures. Moreover, all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
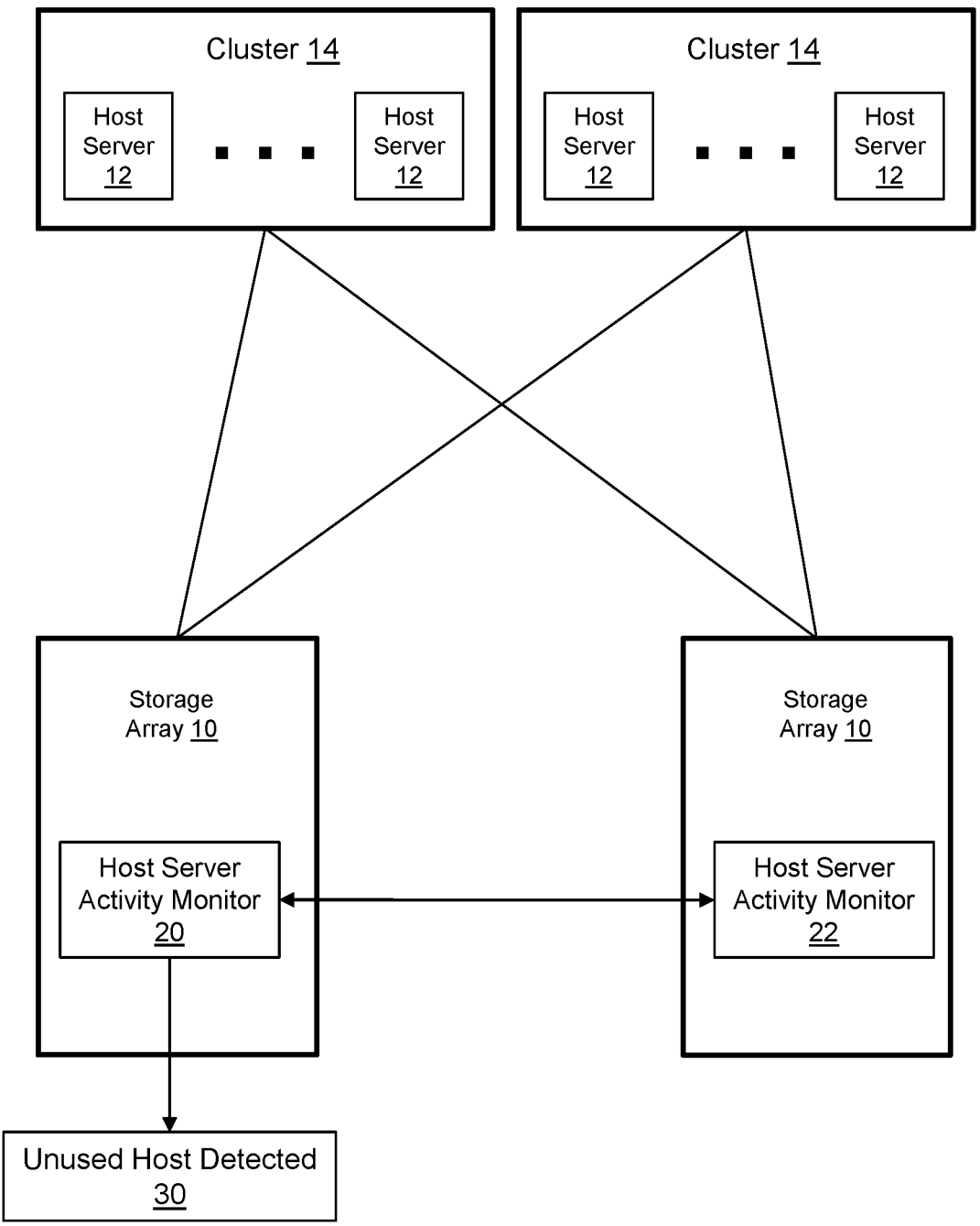
FIG. 1 illustrates a data center that includes clusters of host servers and storage arrays with host server activity monitors.

FIG. 1 illustrates a data center that includes multiple clusters 14 of host servers 12 and multiple storage arrays 10 configured with host server activity monitors 20, 22. Each cluster may include hundreds or thousands of host servers and some or all of the host servers may have connectivity with both of the storage arrays. Moreover, there may be more than two storage arrays and host servers may have connectivity to any number of the storage arrays. Because the host servers and storage arrays are configured in an initiator-target relationship, the storage array does not send storage commands to the host servers and is not exposed to the configuration of VMs or Guest OSs and host application instances on the host server. The host server activity monitors 20, 22 observe activity of individual host servers by examining communications and creating a record such as a log of meaningful communications received from the host servers. Meaningful communications are commands that are indicative of productive activity. Examples of commands that are indicative of productive activity include, but are not limited to, read/write (RD/WR) input-output (IO) commands, vendor unique (VU) commands, and commands used to reconfigure and manage the storage array. Commands that do not indicate productive activity, such as commands associated with maintenance of connectivity, e.g., inquiry utility (Inq), test unit ready (TUR), read capacity (RC), and keep alive, are not considered meaningful communications. Host inactivity is indicated when a host server fails to send a meaningful communication within a predetermined timeout interval between meaningful communications. Upon detection of host inactivity, the host server activity monitor that detected the host inactivity condition communicates with the other host server activity monitors to determine whether the inactivity condition is true throughout the data center, i.e., that no other activity monitor has observed successive meaningful communications from the host server within the timeout interval relative to the present time. If the inactivity condition is true throughout the data center, then a message 30 is generated that identifies the detected inactive host server as being potentially unused. The message can be used to prompt reconfiguration, decommissioning, or repurposing of the unused host server. A host server can be flagged as unused for other reasons as will be explained below.

Figure 2:
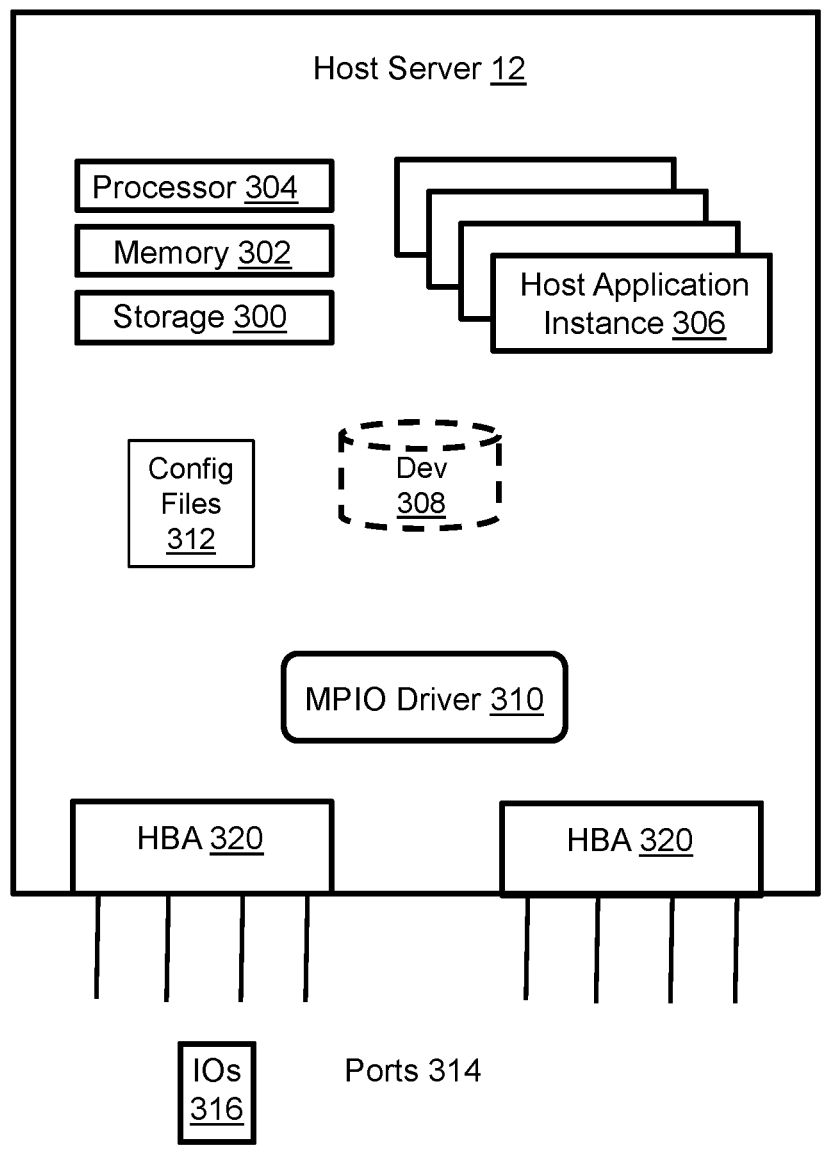
FIG. 2 illustrates one of the host servers in greater detail.

FIG. 2 illustrates one of the host servers 12 in greater detail. The host server includes volatile memory 302, non-volatile storage 300, one or more tangible processors 304 that support host application instances 306, ports 314, a Multi-Path Input-Output (MPIO) driver 310 running in a host kernel, and one or more host bus adapters (HBA) 320. Examples of host applications might include, but are not limited to, software for email, accounting, sales, inventory control, manufacturing, and a wide variety of other organizational functions. The MPIO driver 310 discovers a storage object that is maintained and presented by one or more of the storage arrays for use by host application instances 306. A corresponding logical host device 308 that is a representation of that storage object is generated locally for access by the host application instances 306. The instances of the host application use the logical host device 308 for data access, e.g., to read and write host application data to logical addresses. Corresponding RD/WR IOs 316 are generated and sent to at least one of the storage arrays via the MPIO driver and HBA to access the storage object to read and write data. More specifically, the MPIO driver selects from among the multiple available paths between the host server and the storage array in order to balance IO loading. The IO is sent to the storage array via the host server and storage array ports corresponding to the selected path. Configuration files 312 maintained by the host server include metadata that describes the paths supported by the host server. For example, the port IDs and authentication credentials for each supported path are included in the configuration files, which may be persistently stored in storage and copied into memory for low latency access during operation.

Figure 3:
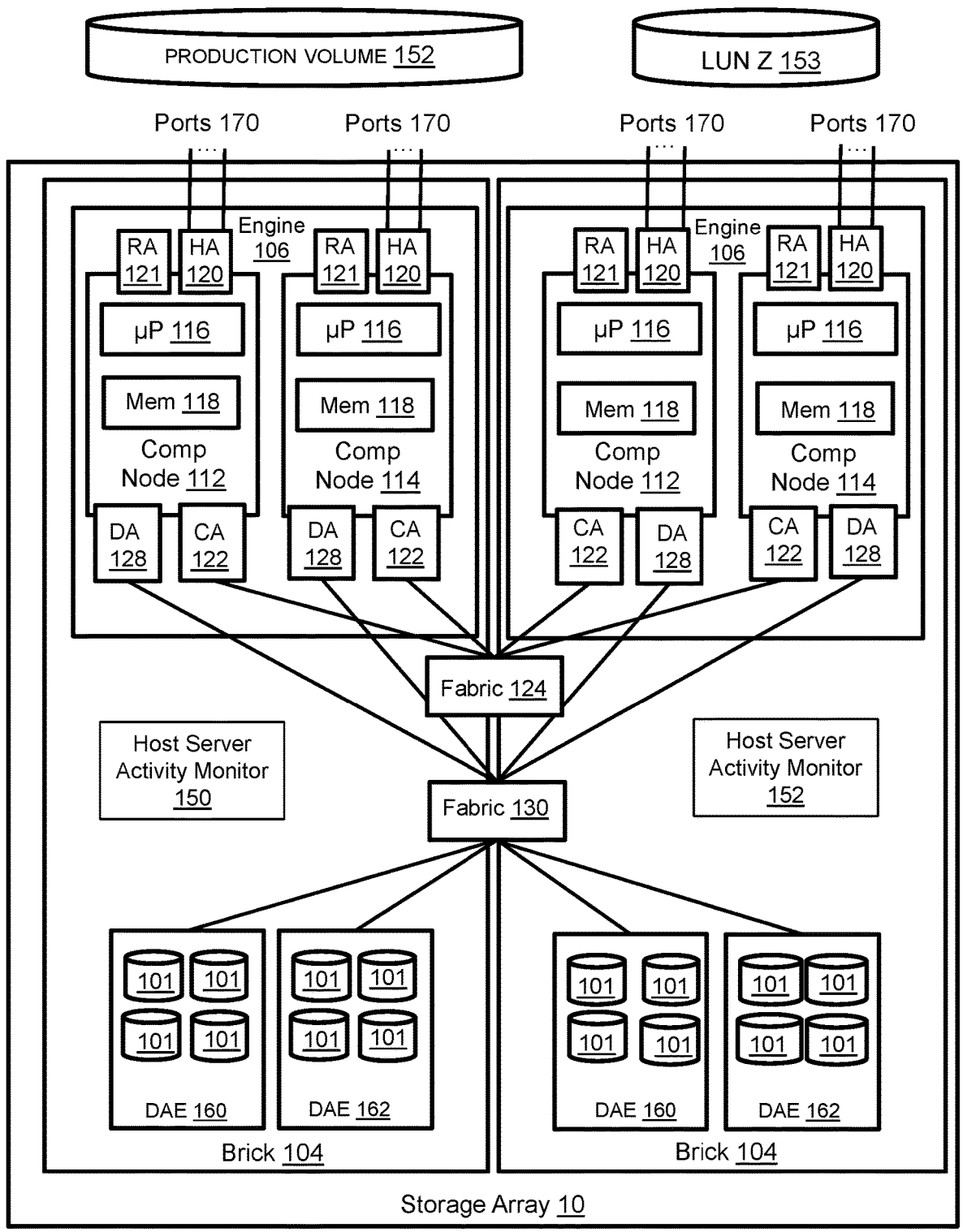
FIG. 3 illustrates one of the storage arrays in greater detail.

FIG. 3 illustrates one of the storage arrays 10 in greater detail. The storage array includes one or more bricks 104. Each brick 104 includes an engine 106 and one or more disk array enclosures (DAEs) 160, 162. In the illustrated example there are only two engines, but the storage array could include a greater number of engines or a single engine. Each engine 106 includes two interconnected compute nodes 112, 114 that are arranged as a memory-mirrored pair for failover and may be referred to as "storage directors." Although it is known in the art to refer to the compute nodes of a SAN as "hosts," that naming convention is avoided in this disclosure to help distinguish the host servers from the compute nodes 112, 114. Each compute node may be implemented on a separate printed circuit board or blade and includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Host server activity monitor instances 150, 152 can run on the compute nodes of each engine, e.g., using the processors and memory. Each compute node allocates a portion of its local memory to a shared memory that can be accessed by all compute nodes of the storage array using direct memory access (DMA). Each compute node includes one or more host adapters (HAs) 120 for communicating with the host servers. Each host adapter has multiple ports 170 for communicating with the host servers, which may be referred to as "initiators" that send IO commands to the storage array as a "target." Each initiator-target port pair defines a path. Each host server may be connected to the storage array via multiple ports corresponding to multiple paths that enable load balancing and failover. The host adapter resources include processors, volatile memory, and components such as IO chips that monitor link errors and IO failures such as missing frames, timeouts, and received aborts. Each compute node also includes a remote adapter (RA) 121 for communicating with other storage systems, e.g., the other storage arrays. Each compute node also includes one or more disk adapters (DAs) 128 for communicating with managed drives 101 in the DAEs 160, 162. Each disk adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 include non-volatile storage media that may be of any type, e.g., solid-state drives (SSDs) based on EEPROM technology such as NAND and NOR flash memory and hard disk drives (HDDs) with spinning disk magnetic storage media. Disk controllers may be associated with the managed drives as is known in the art. An interconnecting fabric 130 enables implementation of an N-way active-active backend. A backend connection group includes all disk adapters that can access the same drive or drives. In some implementations, every disk adapter 128 in the storage array can reach every DAE via the fabric 130. Further, in some implementations every disk adapter in the storage array can access every managed disk 101.

Data created and used by the host application instances running on the host servers is maintained on the managed drives 101 of the storage array 10. The managed drives 101 are not discoverable by the host servers but the storage array creates at least one storage object (production volume 152) for each host application that can be discovered and accessed. Without limitation, such a storage object may be referred to as a production volume, source device, production device, or production LUN, where the logical unit number (LUN) is a number used to identify logical storage volumes in accordance with the small computer system interface (SCSI) protocol. From the perspective of the host servers, production volume 152 is a single disk having a set of contiguous fixed-size logical block addresses (LBAs) on which data used by the instances of one of the host applications resides. However, the host application data is stored at non-contiguous addresses on various managed drives 101.

The compute nodes maintain metadata that maps between the production volume 152 and the managed drives 101 in order to process RD/WR IOs from the host servers. The storage array may create and utilize other storage objects that are not discoverable by the host servers, e.g., storage objects at intermediate levels of abstraction between the managed drives and production volumes.

A storage object known as a LUN Z 153 is a message-only storage object that can be discovered by the host servers and responds to registration commands but does not respond to RD/WR IOs. A host server registers with the storage array by discovering and sending registration commands to LUN Z, including self-identifying by indicating the host server world-wide name (WWN). A host server that is registered with a storage array is characterized to be "zoned." Zoned host servers are not able to send RD/WR IOs to production volumes unless they are masked to those production volumes. A masking view created and maintained by the storage array limits discovery of production volumes and access by host computers in accordance with authorization as indicated by the masking view. A host server that is masked to at least one production volume is characterized as "masked."

Figure 4:
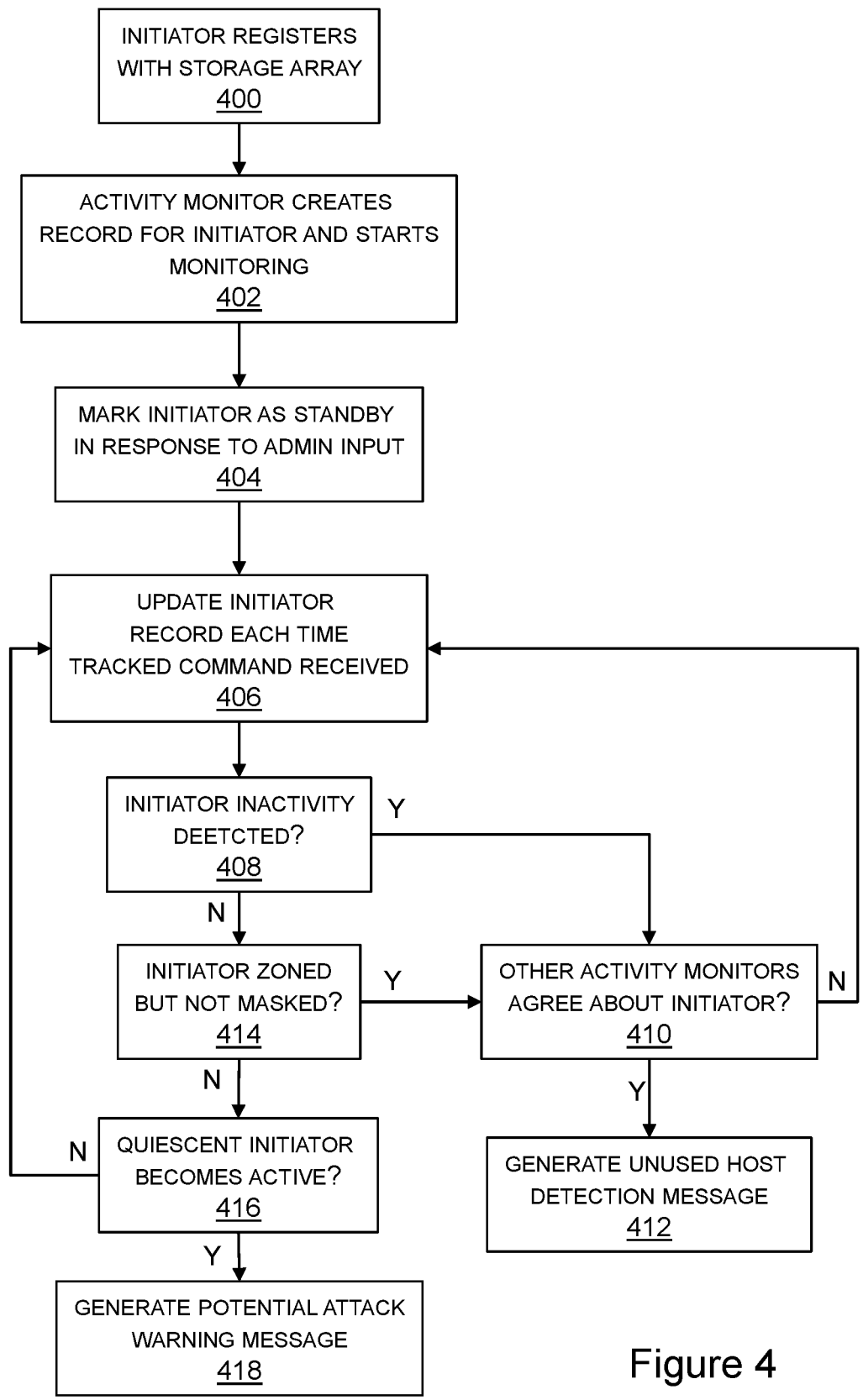
FIG. 4 illustrates operation of the host server activity monitors.

FIG. 4 illustrates operation of the host server activity monitors. An initiator such as a host server registers with a storage array in step 400. This step includes obtaining an identification of the host server such as the WWN. The host server is then considered to be zoned. In step 402 the activity monitor creates a log for the initiator and starts monitoring receipt of meaningful commands from the initiator. As indicated in step 404, an administrator may provide input prompting the initiator to be marked as a "standby" host server. Initiators marked as standby are not flagged for inactivity but may be flagged for activity as will be explained below. Only meaningful commands that are indicative of productive activity are tracked by the log. When a meaningful command is received, the initiator log is updated with a timestamp indicating when the meaningful command was received as indicated in step 406. The logs are processed to detect inactivity in step 408. Inactivity may be indicated by failure to receive a meaningful command within a timeout interval that represents a maximum amount of elapsed time between receipt of successive meaningful commands from an active host server. When inactivity of one of the monitored initiators is detected, then the activity monitor that detected the trigger collaborates with the other activity monitors as indicated in step 410. Collaboration between activity monitors may include exchange of messages between activity monitors running within a storage array and activity monitors running on different storage arrays. All of the activity monitors within a predetermined domain such as the data center are included in the collaboration because individual host servers do not necessarily send meaningful commands to all engines and storage arrays. Some of the activity monitors may lack a record for the initiator. Agreement with the inactivity condition may be indicated where none of the activity monitors have logged activity that negates the condition, e.g., by indicating receipt of meaningful commands within the timeout interval relative to present time. If all the activity monitors agree, then an unused host detection message is indicated in step 412. The message identifies the potentially unused host server, e.g., by WWN.

When none of the monitored initiators are inactive as determined in step 408, then a search is performed to identify any initiators that are zoned but not masked as indicated in step 414. If an initiator is zoned but not masked, then the activity monitor that detected the condition collaborates with the other activity monitors as indicated in step 410. Agreement among the activity monitors may be indicated where the initiator is not masked to any storage array within the domain. If all the activity monitors agree, then an unused host detection message is indicated in step 412.

If none of the monitored initiators are zoned but not masked as determined in step 414, then the initiator logs are used to identify any quiescent initiators that have become active. Quiescent initiators include initiators that are marked as standby and initiators that have been flagged as unused host servers for at least a predetermined length of time. If any of the monitored quiescent initiators has become active by sending meaningful commands as determined at step 416, then a potential malicious attack warning message is generated at step 418. Otherwise, initiator records continue to be updated by returning to step 406.

In view of the description above it will be apparent that unused host servers can be detected by storage nodes based on failure to generate meaningful communications or being zoned but not masked. Further, quiescent host servers that have potentially been compromised and used to initiate a malicious attack can be detected by storage nodes based on generation of meaningful communications.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
monitoring communications from a plurality of host servers to a plurality of storage nodes within a domain in which the host servers are zoned to the storage nodes and have connectivity with the storage nodes;
identifying and tracking, from the communications, read/write (RD/WR) input-output (IO) commands from respective host servers of the plurality of host servers to production storage objects for which the host servers are masked and that contain data created and used by host applications running on the host servers, the RD/WR IO commands not including commands associated with maintenance of connectivity, including inquiry utility (Inq), test unit ready (TUR), read capacity (RC), heartbeat, and keep alive;
determining that a first host server of the plurality of host servers has connectivity with the storage nodes and has ceased generating RD/WR IO commands that read data from and write data to the production storage objects with which the first host server is masked;
identifying the first host server as being connected with the storage nodes but unused based on cessation of generation of RD/WR IO commands that read data from and write data to the production storage objects with which the first host server is masked;
generating a message that indicates that the first host server is connected with the storage nodes, zoned, and masked to at least one production storage object, but unused; and
generating a warning of a potential malicious attack responsive to determining that the host server that ceased generating RD/WR IO commands that read data from and write data to the production storage objects with which the first host server is masked has started generating RD/WR IO commands that read data from and write data to the production storage objects with which the first host server is masked again after a predetermined period of inactivity.

2. The method of claim 1 further comprising monitoring the communications by instances of monitoring software running on the storage nodes.

3. The method of claim 2 further comprising the instances of monitoring software collaborating to determine that the one of the host servers has ceased generating RD/WR IO commands that read data from and write data to the production storage objects with which the first host server is masked to all the storage nodes within the domain.

4. The method of claim 1 further comprising generating a message to prompt remedial action responsive to determining that one of the host servers is zoned with at least one of the storage nodes and not masked to a production storage object.

5. The method of claim 1 further comprising generating a warning of a potential malicious attack responsive to determining that one of the host servers is marked as standby and has started generating RD/WR IO commands that read data from and write data to the production storage objects with which the first host server is masked.

6. The method of claim 1 further comprising maintaining a record of elapsed time since receipt of a RD/WR IO commands that read data from and write data to the production storage objects with which the first host server is masked from each of the host servers.

7. An apparatus comprising:
a plurality of storage nodes configured to:
monitor communications from a plurality of host servers within a domain in which the host servers are zoned to the storage nodes and have connectivity with the storage nodes;
identify and track, from the communications, read/write (RD/WR) input-output (IO) commands from respective host servers of the plurality of host servers to production storage objects for which the host servers are masked and that contain data created and used by host applications running on the host servers, the RD/WR IO commands not including commands associated with maintenance of connectivity, including inquiry utility (Inq), test unit ready (TUR), read capacity (RC), heartbeat, and keep alive;
determine that a first host server of the plurality of host servers has connectivity with the storage nodes and has ceased generating RD/WR IO commands that read data from and write data to the production storage objects with which the first host server is masked;
identify the first host server as being connected with the storage nodes but unused based on cessation of generation of RD/WR IO commands that read data from and write data to the production storage objects with which the first host server is masked;
generate a message that indicates that the first host server is connected with the storage nodes, zoned, and masked to at least one production storage object, but unused; and
generate a warning of a potential malicious attack responsive to a determination that the host server that ceased generating RD/WR IO commands that read data from and write data to the production storage objects with which the first host server is masked has started generating RD/WR IO commands that read data from and write data to the production storage objects with which the first host server is masked again after a predetermined period of inactivity.

8. The apparatus of claim 7 further comprising instances of monitoring software running on the storage nodes to monitor the communications.

9. The apparatus of claim 8 further comprising the instances of monitoring software configured to collaborate to determine that the one of the host servers has ceased generation of RD/WR IO commands that read data from and write data to the production storage objects with which the first host server is masked to all the storage nodes within the domain.

10. The apparatus of claim 7 further comprising at least one of the storage nodes configured to generate a message to prompt remedial action responsive to a determination that one of the host servers is zoned with at least one of the storage nodes and not masked to a production storage object.

11. The apparatus of claim 7 further comprising at least one of the storage nodes configured to generate a warning of a potential malicious attack responsive to a determination that one of the host servers is marked as standby and has started generating RD/WR IO commands that read data from and write data to the production storage objects with which the first host server is masked.

12. The apparatus of claim 7 further comprising the storage nodes configured to maintain a record of elapsed time since receipt of a RD/WR IO commands that read data from and write data to the production storage objects with which the first host server is masked from each of the host servers.

13. A non-transitory computer-readable storage medium storing instructions that when executed by a computer cause the computer to perform a method comprising:
monitoring communications from a plurality of host servers to a plurality of storage nodes within a domain in which the host servers are zoned to the storage nodes and have connectivity with the storage nodes;
identifying and tracking, from the communications, read/write (RD/WR) input-output (IO) commands from respective host servers of the plurality of host servers to production storage objects for which the host servers are masked and that contain data created and used by host applications running on the host servers, the RD/WR IO commands not including commands associated with maintenance of connectivity, including inquiry utility (Inq), test unit ready (TUR), read capacity (RC), heartbeat, and keep alive;
determining that a first host server of the plurality of host servers has connectivity with the storage nodes and has ceased generating RD/WR IO commands that read data from and write data to the production storage objects with which the first host server is masked;
identifying the first host server as being connected with the storage nodes but unused based on cessation of generation of RD/WR IO commands that read data from and write data to the production storage objects with which the first host server is masked;
generating a message that indicates that the first host server is connected with the storage nodes, zoned, and masked to at least one production storage object, but unused; and
generating a warning of a potential malicious attack responsive to determining that the host server that ceased generating RD/WR IO commands that read data from and write data to the production storage objects with which the first host server is masked has started generating RD/WR IO commands that read data from and write data to the production storage objects with which the first host server is masked again after a predetermined period of inactivity.

14. The non-transitory computer-readable storage medium of claim 13 in which the method further comprises monitoring the communications by instances of monitoring software running on the storage nodes.

15. The non-transitory computer-readable storage medium of claim 14 in which the method further comprises the instances of monitoring software collaborating to determine that the one of the host servers has ceased generating RD/WR IO commands that read data from and write data to the production storage objects with which the first host server is masked to all the storage nodes within the domain.

16. The non-transitory computer-readable storage medium of claim 13 in which the method further comprises generating a message to prompt remedial action responsive to determining that one of the host servers is zoned with at least one of the storage nodes and not masked to a production storage object.

17. The non-transitory computer-readable storage medium of claim 13 in which the method further comprises generating a warning of a potential malicious attack responsive to determining that one of the host servers is marked as standby and has started generating RD/WR IO commands that read data from and write data to the production storage objects with which the first host server is masked.

* * * * *